(12) United States Patent
Nomura et al.

(10) Patent No.: US 7,710,535 B2
(45) Date of Patent: May 4, 2010

(54) LIQUID CRYSTAL LENS ELEMENT AND OPTICAL HEAD DEVICE

(75) Inventors: Takuji Nomura, Koriyama (JP); Hiroyuki Kojima, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 768 days.

(21) Appl. No.: 11/621,128

(22) Filed: Jan. 9, 2007

(65) Prior Publication Data

US 2007/0109489 A1    May 17, 2007

Related U.S. Application Data

(63) Continuation of application No. PCT/JP2005/013087, filed on Jul. 14, 2005.

(30) Foreign Application Priority Data

Jul. 15, 2004    (JP)    ............... 2004-208302

(51) Int. Cl.
*G02F 1/13*    (2006.01)
(52) U.S. Cl. .................. 349/200; 349/201; 349/202
(58) Field of Classification Search .......... 349/200–202
See application file for complete search history.

(56) References Cited

U.S. PATENT DOCUMENTS

| 5,416,757 | A | 5/1995 | Luecke et al. |
| 2003/0002425 | A1 | 1/2003 | Yamamoto et al. |
| 2005/0226122 | A1 | 10/2005 | Ooi et al. |
| 2006/0280100 | A1 | 12/2006 | Ooi et al. |

FOREIGN PATENT DOCUMENTS

| JP | 61156227 A * | 7/1986 | .................. 349/200 |
| JP | 5-205282 | 8/1993 | |
| JP | 9-189892 | 7/1997 | |
| JP | 11-39704 | 2/1999 | |

(Continued)

OTHER PUBLICATIONS

U.S. Appl. No. 11/589,088, filed Oct. 30, 2006, Ooi et al.

(Continued)

*Primary Examiner*—James A Dudek
(74) *Attorney, Agent, or Firm*—Oblon, Spivak, McClelland, Maier & Neustadt, L.L.P.

(57) ABSTRACT

A liquid crystal lens element having a lens function capable of stably correcting spherical aberration containing a power component corresponding to focus change of incident light according to the magnitude of applied voltage.

The liquid crystal lens element comprises a pair of transparent substrates 11 and 12, one (12) of the transparent electrodes is provided with a transparent electrode 15 and a Fresnel lens surface 17, and the other one (11) of the pair of transparent electrodes is provided with a phase correction surface 18 and a transparent electrode 16. Thus, by disposing a Fresnel lens surface 17 and a liquid crystal layer 13 between a pair of transparent electrodes 15 and 16, it becomes possible to change substantial refractive index distribution of the liquid crystal layer 13 according to the magnitude of applied voltage, and to add a positive or negative power to a wavefront transmitted through the liquid crystal layer 13, the Fresnel lens surface 17 and the phase correction surface 18.

10 Claims, 6 Drawing Sheets

FOREIGN PATENT DOCUMENTS

| | | |
|---|---|---|
| JP | 2001-209966 | 8/2001 |
| JP | 2002-251774 | 9/2002 |
| JP | 2002-319172 | 10/2002 |
| JP | 2003-67969 | 3/2003 |
| JP | 2003-115127 | 4/2003 |
| JP | 2004-101885 | 4/2004 |
| JP | 2004-103058 | 4/2004 |

OTHER PUBLICATIONS

U.S. Appl. No. 11/625,005, filed Jan. 19, 2007, Ooi et al.
U.S. Appl. No. 11/670,780, filed Feb. 2, 2007, Murata et al.
U.S. Appl. No. 11/737,177, filed Apr. 19, 2007, Osawa et al.

* cited by examiner

LIQUID CRYSTAL LENS ELEMENT AND OPTICAL HEAD DEVICE

TECHNICAL FIELD

The present invention relates to a liquid crystal lens element and an optical head device, in particular, to a liquid crystal lens capable of switching the focal length among different focal lengths according to a magnitude of applied voltage, and an optical head device employing the liquid crystal lens, for writing and/or reading an information to/from an optical recording medium.

BACKGROUND ART

As examples of an optical recording medium (hereinafter referred to as "optical disk") having an information recording layer formed on a surface of light-incident side, and a transparent resin covering the information recording layer, e.g. CDs and DVDs are widely used. Further, in an optical head device for writing and/or reading an information to/from DVDs, one employing a laser diode of 660 nm wavelength band as a light source and an objective lens having a NA (numerical aperture) of from 0.6 to 0.65, are known.

Heretofore, a commonly used DVD (hereinafter referred to as "single layer optical disk"), has a single information recording layer and a cover layer of 0.6 mm thick. However, in recent years, in order to increase information amount in each optical disk, a read-only type or a readable-writable type optical disk having two information recording layers (hereinafter referred to as "double layer optical disk") has been developed.

Thus in a case of writing and/or reading to/from a double layer optical disk by using an optical head device having an objective lens optimally designed to have zero aberration for a single layer optical disk, when a cover thickness is different, a spherical aberration is generated according to the difference of the cover thickness and convergence of incident light to an information recording layer is deteriorated. In particular, in a case of double-layer optical disk of writing type, deterioration of convergence corresponds to decrease of converging power density, which causes a writing error, such being a problem.

To cope with this problem, in recent years, in order to improve recording density of an optical disk, an optical disk having a cover thickness of 0.1 mm (hereinafter it is also referred to as "high density optical disk") is also proposed. Further, an optical head device for writing an information to such an optical disk, employs a laser diode emitting laser light of 405 nm wavelength band and an objective lens having a NA of 0.85. However, also in this case, with respect to a double layer optical disk of recording type, a spherical aberration generated corresponding to the difference of the cover thickness, causes a writing error, such being a problem.

As means for correcting a spherical aberration caused by the difference of the cover thickness of e.g. the above-mentioned double layer optical disk, a method of employing movable lens group or a liquid crystal lens, has been known.

(I) For example, in order to carry out correction of spherical aberration by using a movable lens group, an optical head device 100 shown in FIG. 8 for writing and/or reading an optical disk D, has been proposed (for example, JP-A-2003-115127).

The optical head device 100 comprises a light source 110, an optical system 120 of various types, a photo-acceptance element 130, a control circuit 140 and a modulation/demodulation circuit 150, and further, a first and a second movable lens groups 160 and 170. Further, the first movable lens group 160 includes a concave lens 161, a convex lens 162 and an actuator 163, which exhibits a focal-length variable lens function that a power of the movable lens group 160 is continuously changeable from positive (convex lens) to negative (concave lens) by moving the convex lens 162 fixed to the actuator 163 in an optical axis direction. By disposing the movable lens group 160 in an optical path to an optical disk D, it becomes possible to correct a spherical aberration containing a power component and to adjust a focal point of incident light to an information recording layer (not illustrated) of the optical disk D having a different cover thickness.

However, in the case of employing the movable lens group 160, there has been a problem that the size of the optical head device 100 becomes larger since the pair of lenses 161 and 162 and the actuator 163 are required, and the mechanical design for the movement becomes complicated.

(II) Further, in order to correct a spherical aberration caused by the difference of cover thickness of an optical disk, an optical head device employing a is liquid crystal lens 200 as shown in FIG. 9, has been proposed (for example, JP-A-5-205282).

The liquid crystal lens 200 has a construction that it comprises a substrate 230 having a flat surface on which a transparent electrode 210 and an alignment film 220 are formed, a substrate 260 having a curved surface symmetric about an axis and having a surface shape $S(r)$ represented by the following formula being a sum of powers of a radius r, on which a transparent electrode 240 and an alignment film 250 are formed, and a nematic liquid crystal 270 sandwiched by the substrates 230 and 260.

In the liquid crystal lens 200, when a voltage is applied between the transparent electrodes 210 and 240, alignment of molecules of the liquid crystal 270 changes and the refractive index of the liquid crystal 270 changes. As a result, a wavefront of transmission light changes in accordance with refractive index difference between the substrate 260 and the liquid crystal 270.

Here, the refractive index of the substrate 260 equals to the refractive index of the liquid crystal 270 when no voltage is applied. Accordingly, when no voltage is applied, transmission wavefront is not changed from that of incident light. On the other hand, when a voltage is applied between the transparent electrodes 210 and 240, a refractive index difference $\Delta n$ is generated between the substrate 260 and the liquid crystal 270, and phase difference of transmission light corresponding to $\Delta n \cdot S(r)$ is generated (refer to Formula (1) for $S(r)$). Accordingly, it is possible to correct an aberration by fabricating the surface shape $S(r)$ of the substrate 260 so as to correct a spherical aberration caused by the difference of cover thickness of an optical disk D, and by adjusting the refractive index difference $\Delta n$ according to applied voltage.

$$S(r) = \alpha_1 r^2 + \alpha_2 r^4 + \alpha_3 r^6 + \ldots \quad (1)$$

wherein $r^2 = x^2 + y^2$

However, in the case of liquid crystal lens described in FIG. 9, since the refractive index change of the liquid crystal 270 in response to applied voltage is at most about 0.3, it is necessary to increase the concave-convex height of $S(r)$ to generate a large phase difference distribution $\Delta n \cdot S(r)$ corresponding to a power component for changing the position of a focal point of incident light. As a result, the layer of liquid crystal 270 becomes thicker, which causes problems that driving voltage increases and response becomes slower.

To cope with this problem, in order to reduce thickness of liquid crystal layer, it is effective to correct only spherical aberration requiring minimum amount of aberration correction, except for power component. However, when the substrate 260 is fabricated to have a surface shape S(r) so as to correct only spherical aberration, if the optical axis of an objective lens for converging incident light on an information recording layer of an optical disk, and the optical axis of the liquid crystal lens are not aligned to each other, a coma aberration is generated which causes a problem that convergence to the information recording layer is deteriorated and writing or reading is prevented.

(III) By the way, in order to develop a substantial lens function capable of changing also a power component corresponding to change of the position of focal point of incident light without increasing the thickness of liquid crystal layer, a liquid crystal diffraction lens 300 shown in FIG. 10 is also proposed (for example, JP-A-9-189892).

In the liquid crystal diffraction lens 300, a transparent electrode 320 is formed on one side of a substrate 310 on which a predetermined saw-tooth-shaped relief is formed, and the transparent electrode 320 and an opposing electrode 330 sandwich a liquid crystal layer 340. When a voltage is applied between the electrodes 320 and 330, substantial refractive index of the liquid crystal layer 340 for extraordinarily polarized light changes from an extraordinary refractive index $n_e$ to an ordinary refractive index $n_o$. Here, "substantial refractive index" means an average refractive index in the thickness direction of the liquid crystal layer.

Provided that the refractive index of the substrate 310 having the saw-tooth-shaped relief structure is designated as $n_F$, and the wavelength of incident light is designated as $\lambda$, by forming the saw-tooth-shaped relief grooves so as to have a depth d satisfying an equation $d=\lambda/(n_e-n_F)$, maximum diffracting efficiency is obtained at the wavelength $\lambda$ when no voltage is applied, and thus, a diffraction lens is formed. Further, even if the wavelength $\lambda$ of incident light is changed, application voltage can be adjusted so as to produce the maximum diffraction at the wavelength $\lambda$.

In the liquid crystal diffraction lens 300 having such a construction, since it is only necessary to fill the grooves of the saw-tooth-shaped relief with the liquid crystal layer 340, the liquid crystal layer 340 can be thinner than the liquid crystal 270 shown in FIG. 9 which is a type of liquid crystal to be used for the above-mentioned liquid crystal lens 200 to correct spherical aberration containing a power component.

However, in the liquid crystal diffraction lens 300, since the transparent electrode 320 is formed on the saw-tooth-shaped relief surface, it is necessary to satisfy a relation $n_o<n_F<n_e$ to obtain power components of both positive and negative. In this case, since $n_o \neq n_F$, a fixed phase difference represented by a formula $\phi=d\times(n_F-n_o)\lambda$ is generated for ordinarily polarized light, which has been a problem in a case of applying the liquid crystal lens to an optical head device employing a polarization optical system.

(IV) In order to obtain power components of both positive and negative for ordinarily polarized light without changing transmission wavefront, a liquid crystal diffraction lens element 400 as shown in FIG. 11 is considered. In the liquid crystal diffraction lens element 400, a liquid crystal layer 414 filling a cell constituted by a pair of transparent substrates 411 and 412 and a seal 413, is driven by transparent electrodes 415 and 416 formed on the transparent substrates 411 and 412. On a surface of the transparent electrode 415, a Fresnel lens surface 417 being a saw-tooth shaped relief surface is formed. In the liquid crystal diffraction lens element 400, since $n_F=n_o$, transmission wavefront does not change for ordinarily polarized light. Further, since distribution of substantial refractive index is formed in the liquid crystal layer 414 according to specific dielectric constant of a material constituting the Fresnel lens surface 417, it is possible to generate power components of both positive and negative according to the magnitude of applied voltage.

However, when a voltage producing 0-th order light having no power change, is applied, since the Fresnel lens surface 417 is disposed between the liquid crystal layer 414 and the transparent electrode 415, a voltage applied to the liquid crystal layer 414 is distributed according to the shape of the Fresnel lens surface 417, and a phase difference is generated. As a result, a problem that diffraction efficiency of 0-th order light decreases, is generated.

DISCLOSURE OF THE INVENTION

Problems to be Solved by the Invention

The present invention has been made considering the above-mentioned circumstances, and it is an object of the present invention to solve the above-mentioned disadvantages of prior arts and to provide a liquid crystal lens element having a lens function capable of stably correcting spherical aberration containing a power component corresponding to focal position change of incident light according to a magnitude of applied voltage. Further, it is another object of the present invention to provide an optical head device employing the liquid crystal lens element and capable of correcting spherical aberration caused by the difference of cover thicknesses between single layer and double layer optical disks and capable of stably writing and/or reading.

Means for Solving the Problems

The present invention provides a liquid crystal lens element comprising a pair of transparent substrates and a liquid crystal layer sandwiched between the transparent substrates and being configured to change focal point of light transmitted through the liquid crystal lens element according to the magnitude of applied voltage; wherein one of the pair of transparent substrates is provided with a phase correction surface constituted by annular portions arranged about an optical axis of the light and having a cross-section of concave-convex shape; a surface of the phase correction surface and a surface of the other one of the pair of transparent substrates are provided with respective transparent electrodes for applying a voltage to the liquid crystal layer; and between the transparent electrodes, a Fresnel lens surface having a rotational symmetry with respect to the optical axis of the light and a cross-section of saw-tooth shape or a cross-section of a saw-tooth shape approximated by steps and made of a transparent material, and the liquid crystal layer are provided.

Further, the present invention provides the above liquid crystal lens element wherein the refractive index of the transparent material constituting the Fresnel lens surface substantially equals to the ordinary refractive index of the liquid crystal layer, and light transmitted through the liquid crystal layer is linearly polarized light having a polarization direction being substantially equal to the extraordinary refractive index direction of the liquid crystal layer.

Further, the present invention provides the above liquid crystal lens element wherein the Fresnel lens surface and the phase correction surface are formed on the same substrate surface so as to sandwich one of the transparent electrodes.

Further, the present invention provides the above liquid crystal lens wherein at least one of the transparent substrates is made of quartz glass and the phase correction surface is formed by etching the surface of the quartz glass.

Further, the present invention provides the above liquid crystal lens element wherein provided that the liquid crystal lens element is designated as a first liquid crystal lens element, besides the first liquid crystal lens element, a second liquid crystal lens element having the same construction as the first liquid crystal lens element is provided and the first and second liquid crystal lens elements are laminated and integrated so that the extraordinary refractive index directions of the respective liquid crystal layers are perpendicular to each other.

Further, the present invention provides the above liquid crystal lens element wherein a phase plate producing a phase difference of an odd number times of Π/2 of the wavelength of the light, is integrated with the liquid crystal lens element.

Further, the present invention provides the above liquid crystal lens element wherein the refractive index of the transparent material constituting the phase correction surface is equal to the ordinary refractive index of the liquid crystal layer.

Further, the present invention provides the above is liquid crystal lens element wherein the phase correction surface and the Fresnel lens surface are disposed so that annular concave portions or convex portions of the phase correction surface having a cross-section of concave-convex shape, overlap annular convex portions of the Fresnel lens surface in the optical axis direction.

Further, the present invention provides an optical head device comprising a light source, an objective lens for converging light emitted from the light source on an optical recording medium, a photodetector for detecting light reflected by the optical recording medium, and the liquid crystal lens element as defined in any one of claims 1 to 6 disposed in an optical path between the light source and the objective lens.

Further, the present invention provides the above optical head device which is adapted to three types of cover layers having different thicknesses covering recording layers of the optical recording medium, and which is capable of switching voltage applied to the liquid crystal lens element among voltages corresponding to the three types of thicknesses so that light-converging performance of the optical head device is optimized for the respective recording layers.

Effects of the Invention

According to the present invention, since transmission wavefront changes according to the magnitude of applied voltage, it is possible to realize a focal-length-variable liquid crystal lens. Further, by the Fresnel lens surface provided in the liquid crystal lens element of the present invention, it becomes possible to reduce the thickness of liquid crystal layer, which leads to low voltage drive and high speed response. Further, by a phase correction surface provided in the liquid crystal lens element of the present invention, it is possible to provide a liquid crystal lens element having high light utilization. Accordingly, in the optical head device provided with such a liquid crystal lens element, it is possible to correct spherical aberration caused by the difference of cover thicknesses in a double-layer optical disk, and further, since the aberration scarcely deteriorates even when a misalignment occurs between an objective lens and the liquid crystal lens element at a time of tracking, an optical head device capable of stably writing and/or reading is realized.

BRIEF DESCRIPTION OF THE DRAWINGS

FIGS. 4(A) and 4(B): Schematic views showing change of phase difference $\phi(r_m)$ generated in an annular portion of the liquid crystal lens element with respect to applied voltage, wherein FIG. 4(A) shows a conventional liquid crystal lens element and FIG. 4(B) shows the liquid crystal lens element of the present invention.

Figure 1:
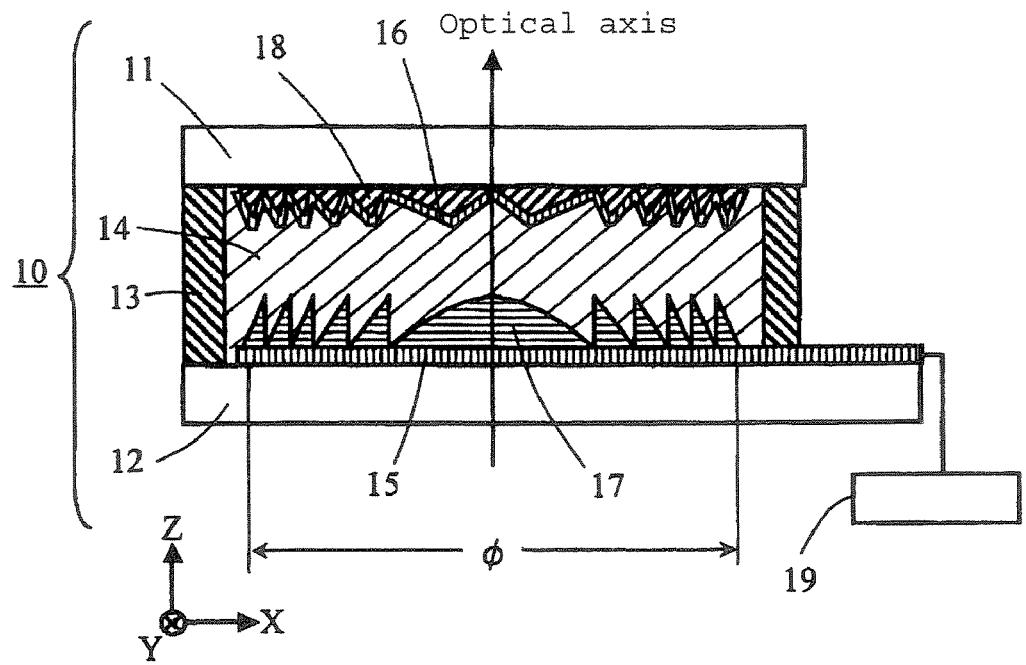
FIG. 1: A cross-sectional view showing a first embodiment of a liquid crystal lens element according to the present invention.

EXPLANATION OF NUMERALS 10 and 20: Liquid crystal lens element
11, 12, 21 and 22: Transparent substrate
13 and 23: Seal
14 and 24: Liquid crystal layer
15, 16, 25 and 26: Transparent electrode
17 and 27: Fresnel lens surface
18 and 28: Phase correction surface
19: External signal source
31: Laser diode
32: Polarizing beam splitter
33: Collimator lens
35: Quarter waveplate
36: Objective lens
37: Cylindrical lens
38: Photodetector
D: Optical disk
D1: First recording layer
D2: Second recording layer

BEST MODE FOR CARRYING OUT THE INVENTION

From now, embodiments of the present invention are described in detail with reference to attached drawings.

FIRST EMBODIMENT

FIG. 1 is a cross-sectional view showing a first embodiment of a liquid crystal lens element of the present invention, in which a liquid crystal lens element according to this embodiment has a liquid crystal layer 14 sandwiched by transparent substrates 11 and 12 and a seal 13. On a surface of the first transparent substrate 12, a transparent electrode 15 and a Fresnel lens surface 17 are formed, and on a surface of the second transparent substrate 11, a phase correction surface 18 and a transparent electrode 16 are formed. The transparent electrodes 15 and 16 are connected with an external signal source 19 to apply a voltage to the liquid crystal layer 14. Although not shown in FIG. 1, on surfaces of the transparent electrode 16 and the Fresnel lens surface 17, alignment films for aligning the liquid crystal layer 14 are formed. Further, an antireflective film may be formed on outer surfaces of the transparent substrates 11 and 12.

Then, an example of production process of the liquid crystal lens element 10 is described as follows.

First of all, a transparent electrode 15 is formed on one surface of the transparent substrate 12. Further, on the transparent electrode 15, a Fresnel lens surface 17 made of a uniform refractive index transparent material having a refractive index of nF constituted by a plurality of annular portions arranged about an optical axis, and having a cross-section of a saw-tooth shape or a saw-tooth shape approximated by steps, is formed.

Meanwhile, on a surface of the transparent substrate 11, first of all, a phase correction surface 18 made of a uniform refractive index transparent material having a refractive index of $n_c$, is formed to have an annular concave-convex shape provided about an optical axis. Further, on an upper surface of the phase correction surface 18, a transparent electrode 16 is formed.

Then, the Fresnel lens surface 17 may be formed by forming a uniform refractive index transparent material layer having a predetermined film thickness on a surface of the transparent electrode 15 and fabricating it into a Fresnel lens shape by photolithography or reactive ion etching, or else, the Fresnel lens surface 17 may be formed by transferring the Fresnel lens shape to the uniform refractive index transparent material layer using a metal mold. In the same manner, the phase correction surface 18 is also formed to have a predetermined thickness and shape on the surface of transparent substrate 11.

Then, on surfaces of the transparent electrode 16 and the Fresnel lens surface 17, parallel alignment treatment is applied so that extraordinary refractive index direction of the liquid layer 14 becomes Y direction. For the alignment treatment, a method of spin coating the substrate surface with an alignment film containing e.g. polyimide as the main composition, and then rubbing the film with e.g. a cloth, a method of forming a SiO oblique vapor deposition film on the substrate surface, or a method of spin coating the substrate surface with an alignment film followed by irradiating the film with polarized ultraviolet rays, may be used.

Then, an adhesive agent, not shown, containing a gap control agent is patterned by printing to form a seal 13, and the transparent substrates 11 and 12 are laminated and press-bonded to form an empty cell. Then, from an injection port (not shown) provided on a part of the seal 13, a liquid crystal having an ordinary refractive index $n_o$ and an extraordinary refractive index $n_e$ (here, $n_o \neq n_e$) is injected, the injection port is sealed to seal the liquid crystal in the cell, to form the liquid crystal lens element 10 of this embodiment.

Then, operation principle of the liquid crystal lens element 10 according to the first embodiment of the present invention is described as follows.

The liquid crystal lens element 10 functions as a Fresnel lens whose focal point is discretely variable by changing substantial refractive index of the liquid crystal layer 14 by switching voltage applied between transparent electrodes 15 and 16. Function by the Fresnel lens surface 17 and function by the phase correction surface 18 are described in detail as follows.

In order to produce a transmission wavefront containing a positive or a negative power component by using the liquid crystal lens element 10 of the present invention, in a transmission wavefront incident into the liquid crystal lens element 10, phase difference φ of light beams transmitting through a point a radius r distant from the optical axis center (coordinate origin: x=y=0), has to be described as the power series shown in the following formula.

$$\phi(0) = a_1 r^2 + a_2 r^4 + a_3 r^6 + a_4 r^8 + \ldots \quad (2)$$

wherein $r^2 = X^2 + y^2$ $a_1, a_2, \ldots$ ; constant

Figure 2:
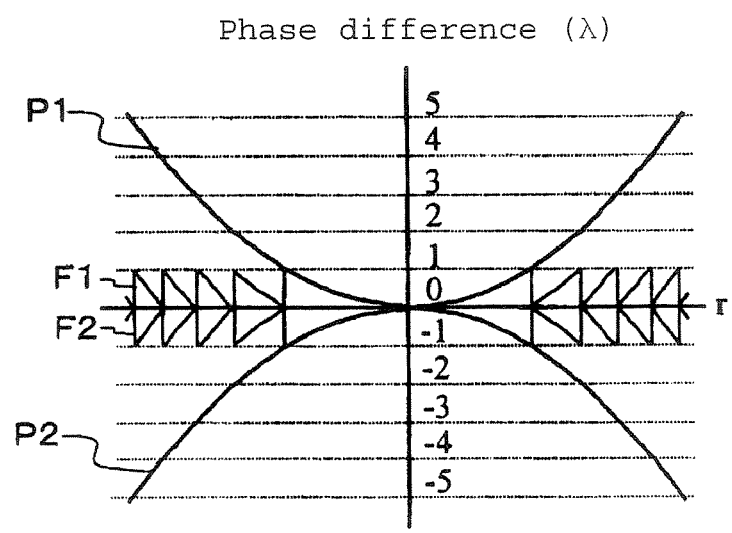
FIG. 2: A graph showing phase difference of a transmission wavefront generated by a liquid crystal lens of the liquid crystal lens element according to the present invention, wherein P1 and P2 are graphs showing phase differences with a unit of wavelength λ, and F1 and F2 are graphs showing phase differences of from 0 to λ produced by adding or subtracting an integer times of wavelength λ from P1 and P2 respectively.

Here, specific examples of a curve of the phase difference of the liquid crystal lens element being an optical path difference from the optical path at r=0, namely at the optical axis position, by a unit of wavelength λ of incident light, in relation to a radial position r of the liquid crystal lens element shown in the horizontal axis, are designated as the reference numerals P1 and P2 in FIG. 2.

In a case of coherent incident light of wavelength λ having a uniform phase, transmission wavefront having a phase difference of an integer times of λ from each other can be regarded as equivalent. Accordingly, graphs F1 and F2 showing phase differences obtained by slicing the graphs of P1 and P2 of FIG. 2 at an interval of wavelength λ and projecting the sliced graphs on a plane of phase difference 0, are substantially equivalent to the graphs P1 and P2 respectively. The phase difference distributions represented by graphs F1 and F2 are all within the wavelength λ and having a cross-section of saw-tooth shape.

In order to obtain phase differences corresponding to the graph F1 or F2 by the liquid crystal lens element 10, the shape of the Fresnel lens surface 17 is fabricated to have the same shape as the graph F1 or F2. The Fresnel lens surface 17 may be made of a uniform refractive index transparent material, and thus, it may be an organic material such as a UV-curable resin, a thermosetting resin or a photosensitive resin, or an inorganic material such as $SiO_2$, $Al_2O_3$ or $SiO_xN_y$ (here, x and y show the element ratio between O and N). These materials each has a volume resistivity by far larger than the volume resistivities of the materials constituting the transparent electrodes 15 and 16, and the volume resistivity of these materials is not sufficiently smaller than that of the liquid crystal material and thus, they can be regarded as dielectric materials.

Figure 3:
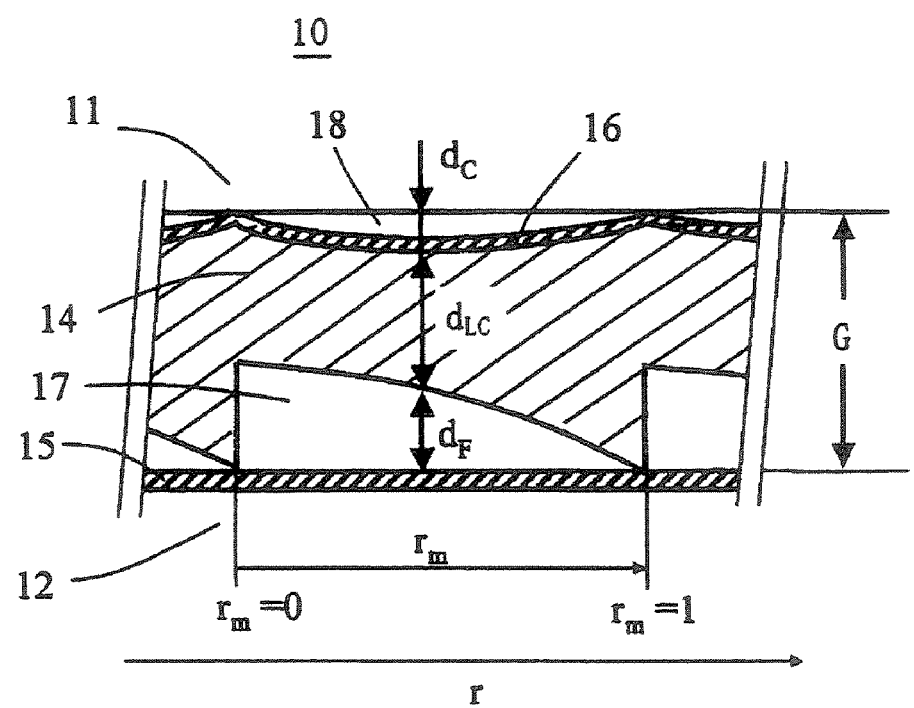
FIG. 3: A cross-sectional enlarged view of the liquid crystal lens element of the first embodiment of the present invention.

FIG. 3 is an enlarged cross-sectional view of the liquid crystal lens element 10 of the present invention, which is an enlarged schematic view of m-th annular portion from the center of the Fresnel lens surface 17. As shown in the figure, in an annular portion m of the Fresnel lens surface 17, a coordinate system $r_m$ normalized by the width of the annular portion is defined, and $r_m$ in the optical axis side of the annular portion m is defined as $r_m=0$, and $r_m$ in the peripheral side is defined as $r_m=1$. The concave-convex thickness of the Fresnel lens 17 is designated as $d_F(r_m)$, the thickness of the liquid crystal layer 14 is designated as $d_{LC}(r_m)$, the concave-convex thickness of the phase correction surface 18 is designated as $d_C(r_m)$, and $G=d_F(r_m)+d_{LC}(r_m)+d_C(r_m)$ becomes a constant value G.

Since the Fresnel lens surface 17 is disposed between the transparent electrodes 15 and 16, effective voltage $V_{LC}$ applied to the liquid crystal layer 14 changes according to the specific dielectric constant $\in_F$ of the material constituting the Fresnel lens surface 17. Specifically, provided that AC voltage applied between the transparent electrodes 15 and 16 is designated as V, $V_{LC}$ is represented by the following formula:

$$V_{LC}=V/\{1+(\in_{LC}/\in_F)\times(d_F/d_{LC})\} \quad (3)$$

Here, $\in_{LC}$ is an effective specific dielectric constant of the liquid crystal layer 14. A liquid crystal has a dielectric constant anisotropy, in which a specific dielectric constant $\in_{//}$ in a long axis direction of liquid crystal molecules is different from a specific dielectric constant $\in_{\perp}$ in a short axis direction of liquid crystal molecules. Accordingly, according to voltage application, alignment direction of liquid crystal molecules changes, and according to the change of alignment direction of liquid crystal molecules, specific dielectric constant $\in_{LC}$ of the liquid crystal layer 14 also changes. According to formula (3), an effective voltage $V_{LC}$ applied to the liquid crystal spatially distributes according to incident position $r_m$ of light, and thus $V_{LC}$ is a function of $r_m$. Accordingly, the voltage $V_{LC}$ is described as $V_{LC}(r_m)$.

When an extraordinarily polarized light for the liquid crystal layer 14 is incident into the liquid crystal lens element of the present invention, substantial refractive index $n(V_{LC})$ of the liquid crystal layer 14 spatially distributes according to incident position $r_m$ of light. In FIG. 3, optical path difference $OP(r_m)$ of light transmitted between the transparent electrodes 11 and 12 are as shown in the following figure.

$$OP(r_m)=n_F\times d_F(r_m)+n(V_{LC})\times d_{LC}(r_m)+n_C\times d_C(r_m)$$

Accordingly, a phase difference $\phi(r_m)$ with respect to an optical path $OP(0)$ of light incident into a point of rm=0, becomes a value as shown in formula (4) Here, 2Π in the numerators is omitted.

$$\phi(r_m) = \{OP(r_m) - OP(0)\}/\lambda \quad (4)$$
$$= \{n_F \times d_F(r_m) + n(V_{LC}(r_m)) \times d_{LC}(r_m) +$$
$$n_C \times d_C(r_m) - n_F \times d_F(0) - n(V_{LC}(0)) \times$$
$$d_{LC}(0) - n_C \times d_C(0)\}/\lambda$$

Figure 4A:
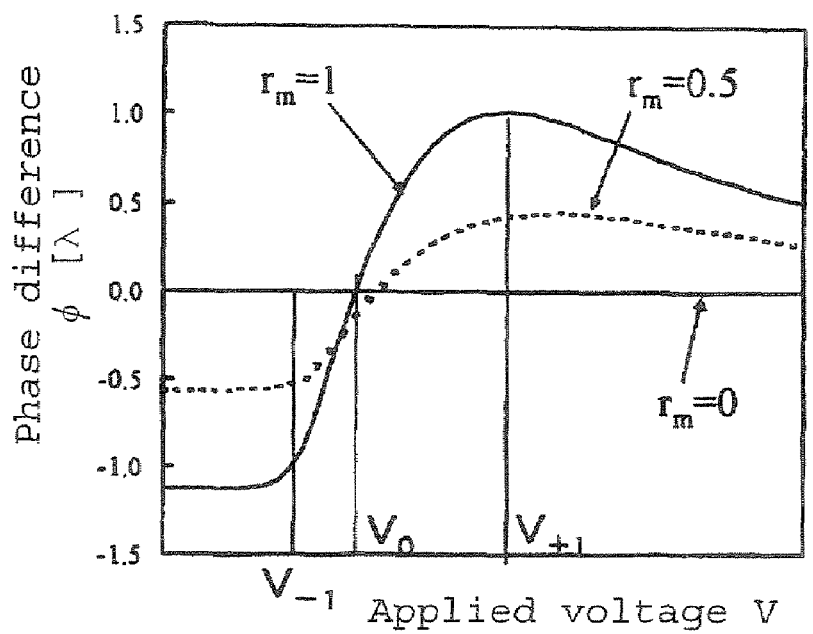
Figure 4B:
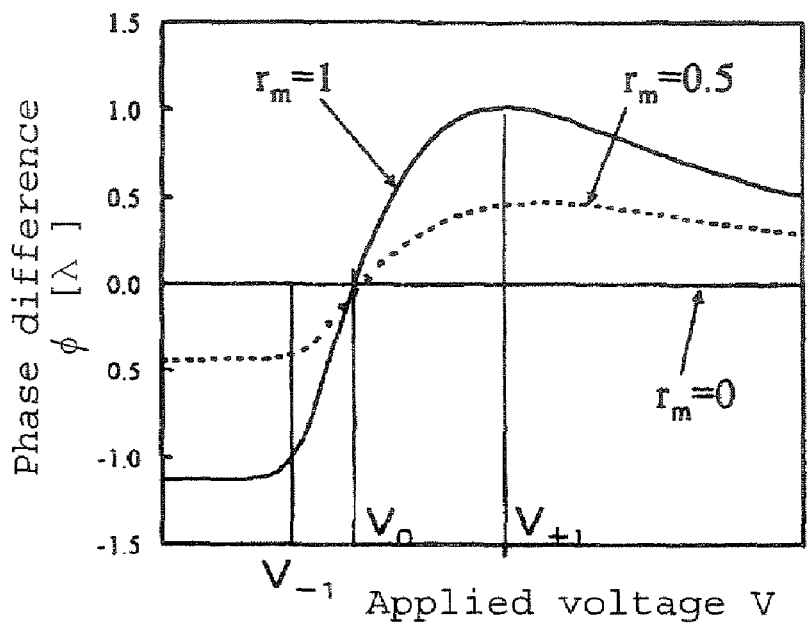
Figure 11:
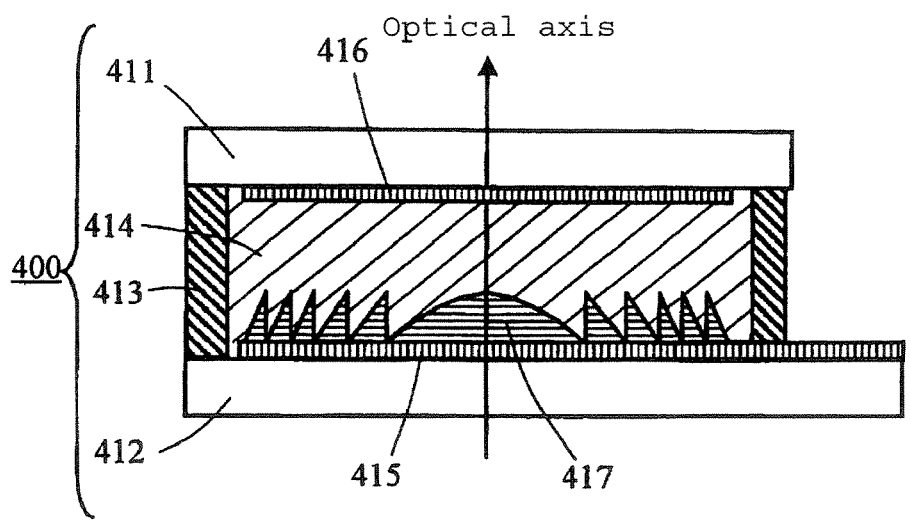
FIG. 11: A cross-sectional schematic view showing an example of the construction of conventional liquid crystal lens element.

FIGS. 4(A) and 4(B) are schematic views showing change of phase difference $\phi(r_m)$ generated in an annular portion of the Fresnel lens surface 17 based on a phase of $r_m$=0, as a function of applied voltage V, wherein solid lines indicate cases of $\phi(r_m=1)$ and broken lines indicate cases of $\phi(r_m=0.5)$. A graph of FIG. 4(A) shows a case of conventional liquid crystal lens element 400 shown in FIG. 11, and a graph of FIG. 4(B) shows a case of the liquid crystal lens element 10 of the present invention.

At a voltage $V_{+1}$ at which the phase difference at $r_m$=1 becomes $\phi(1)\approx\lambda$, a plane wave incident into the liquid crystal lens element is modulated as represented by Fl in FIG. 2, and accordingly, transformed into a +1-st diffraction wavefront as represented by P1 being a wavefront containing positive power, whereby the light becomes converging light. On the other hand, at a voltage $V_{-1}$ producing $\phi(1)\approx-\lambda$, a plane wave incident into the liquid crystal lens element is modulated as represented by F2 of FIG. 2, and as a result, transformed into a −1-st diffraction wavefront represented by P2 containing negative power, whereby the light becomes diverging light. Further, at a voltage $V_0$ producing $\phi(1)\approx0$, incident wavefront does not change and accordingly, focal point of light beams does not change. However, in a conventional example shown in FIG. 4(A), $\phi(0.5)$ becomes $\phi(0.5)\neq0$, namely, phase difference at the center of an annular portion of Fresnel lens surface 17 does not become 0, and a phase shift occurs in the annular portion. AS a result, a wavefront aberration is generated, which causes a problem that light-utilization efficiency (0-th Fresnel diffraction efficiency) decreases. This is caused by the difference of substantial refractive index $n(V_{LC})$ of the liquid crystal layer 14 depending on the position $r_m$ in the annular portion, and according to formula (3), the larger the $\in_{LC}/\in_F$ or the larger the $d_F$, the more the problem becomes significant.

On the other hand, in the liquid crystal lens element of the present invention, phase shift of the 0-th order wavefront is corrected by the phase correction surface 18 (FIG. 4(B)). Accordingly, the refractive index $n_C$ of the material forming the phase correction surface and the thickness $d_C(r_m)$ of the phase correction surface 18, are designed so that a product of the difference between $n_C$ and $n(V_{LC})$ multiplied by $d_C(r_m)$ cancels the phase shift. If $n_C<n(V_{LC})$ is satisfied at the voltage $V_0$, as shown in FIG. 3, it is sufficient to form a convex shape in the center of the annular portion, namely to form the phase correction surface 18 on the transparent substrate 11. Accordingly, since the phase difference shift at $V_0$ becomes substantially 0 in the liquid crystal lens element of the present invention, high light-utilization efficiency can be obtained.

As described above, by employing the liquid crystal lens element of the present invention, by the diffraction lens effect of the Fresnel lens surface, it is possible to obtain a lens function which adds positive power, no power and negative power to a plane wave incident into the liquid crystal lens element 10 at applied voltages $V_{+1}$, $V_0$ and $V_{-1}$ respectively. Further by carrying out phase correction by the phase correction surface, it is possible to improve imaging efficiency especially at an applied voltage $V_0$. Further, the liquid crystal lens element of the present invention has a Fresnel lens surface between a pair of transparent electrodes and is provided with a phase correction surface outside the pair of transparent electrodes. Accordingly, design of electro-optical characteristics of obtainable phase difference is highly flexible by selection of e.g. refractive indexes and specific dielectric constants of the liquid crystal and the Fresnel lens surface, concave-convex thickness or liquid crystal layer thickness, and thus, it is possible to realize low voltage drive or to produce various types of transmission wavefronts.

In the foregoing descriptions, functions of the liquid crystal lens element for extraordinarily polarized light have been described. Then functions of the liquid crystal lens element for ordinarily polarized light are described.

Effective refractive index of the liquid crystal for ordinarily polarized light always equals to the ordinary refractive index of the liquid crystal regardless of applied voltage. Accordingly, a phase difference $\phi(r_m)$ of the liquid crystal lens element 10 is represented by formula (5). Here, 2Π in the numerator is omitted.

$$\phi(r_m) = \{OP(r_m) - OP(0)\}/\lambda \quad (5)$$
$$= \{n_F \times d_F(r_m) + n_O \times d_{LC}(r_m) + n_C \times$$
$$d_C(r_m) - n_F \times d_F(0) + n_O \times d_{LC}(0) +$$
$$n_C \times d_C(0)\}/\lambda$$

-continued $$= \{n_F \times (d_F(r_m) - d_F(0)) + n_O \times (d_{LC}(r_m) -$$

$$d_{LC}(0)) + n_C \times (d_F(r_m) - d_F(0))\}/\lambda$$

$$= \{(n_F - n_O) \times (d_F(r_m) - d_F(0)) + (n_C - n_O) \times$$

$$(d_C(r_m) - d_C(0))\}/\lambda$$

In formula (5), the first term represents a fixed phase difference proportional to the difference between the refractive index $n_F$ of the Fresnel lens surface 17 and the ordinary refractive index $n_o$ of the liquid crystal, and by setting $n_F$ and $n_o$ so that the first term becomes $k\lambda$ (k is an integer), the liquid crystal lens element can be used as a liquid crystal lens of fixed focal point. In order to provide no lens function to ordinarily polarized light, it is sufficient to make $n_F = n_o$ and such a construction is preferred in an application of the liquid crystal lens element to the optical head device to be described later since no excess power is added to light in a returning path. Meanwhile, the second term of the formula (5) is a fixed phase difference proportional to the difference between the refractive index $n_C$ of the phase correction surface 18 and the ordinary refractive index $n_o$ of the liquid crystal, and it is preferred that $n_C = n_o$ since such a construction provides no voltage dependence for ordinarily polarized light. However, if the magnitude of the phase difference satisfies:

$$(n_C - n_o) \times (d_C(r_m) - d_C(0)) < \lambda/10,$$

influence of the phase difference to a wavefront is small and there is substantially no problem, and thus, the refractive index $n_C$ of the phase correction surface 18 may be selected in this range. Particularly, the shape of the phase correction surface 18 is preferably formed directly on a transparent substrate such as a quartz glass by e.g. dry etching technique, since such a method makes fabrication easy.

Further, in this embodiment, besides a liquid crystal lens element producing F1 and F2 that are the same differences produced by slicing the phase differences represented by P1 and P2 of FIG. 2 at an interval of wavelength λ, the liquid crystal lens element may have a shape producing phase differences produced by slicing the phase differences P1 and P2 at an interval of m·λ (m=2 or 3) that is m times of wavelength. In this case, a transmission wavefront corresponding to the phase difference produced by slicing P1 and P2 of FIG. 2 at an interval of m·λ (here, m=2 or 3) that is m times of wavelength.

Further, in a case where the absolute value of a phase difference to be corrected is at most a wavelength λ of incident light, the number of annular portions of the Fresnel lens surface 17 made of a uniform refractive index transparent material of the liquid crystal lens element 10, becomes 1. In this case, it is not necessary to make the Fresnel lens surface 17 to have a Fresnel lens shape but the shape may be a lens shape equal to the shape of objective wavefront. In this case, the phase difference continuously changes according to the magnitude of applied voltage. Further, the number of annular portions of the phase correction surface 18 also becomes 1.

Further, in this embodiment, a liquid crystal lens element having a construction that an AC voltage is applied to the liquid crystal layer 14 via transparent electrodes 15 and 16. In the present invention, besides this construction, for example, segment electrodes obtained by spatially dividing at least one of the transparent electrodes 15 and 16 and adapted to receive respective AC voltages independently, may be employed. By this construction, further various phase difference distribution can be produced.

Further, in this embodiment, an example is described, which employs a liquid crystal having positive dielectric anisotropy in which liquid crystal molecules are aligned in parallel with substrate surfaces at a time of no voltage application and they are aligned vertically to the substrate surfaces according to the magnitude of applied voltage, but other liquid crystal molecule alignment or other liquid crystal material may also be employed. For example, a liquid crystal may be employed, which has a negative dielectric anisotropy in which the liquid crystal molecules are aligned vertically to the substrate surfaces at a time of no voltage application and they are aligned in parallel with the substrate surfaces according to applied voltage V.

Further, in this embodiment, a liquid crystal lens element 10 is described, which has a single liquid crystal layer 14 sandwiched between a pair of transparent substrates 11 and 12, but a second liquid crystal lens element having an equivalent construction and having alignment direction of liquid crystal molecules perpendicular to the liquid crystal lens element 10 may be laminated and integrated with the liquid crystal lens element 10. By this construction, equivalent optical effects are provided by perpendicular two linearly polarized light elements, whereby a lens function can be obtained regardless of incident polarization. Further, an optical element employing a liquid crystal such as a wavefront aberration correction element, may be laminated and integrated.

Further, an optical component such as a phase difference plate, a diffraction grating, a birefringent hologram element or a wavelength-dependent diffraction grating may be appropriately laminated and integrated on a surface of the liquid crystal lens element of the present invention, whereby at a time of constituting an optical head device, the number of optical components is reduced to simplify assembly of the optical head device, such being preferred. Further, the optical components may be molded into a transparent substrate or bonded to the transparent substrate.

SECOND EMBODIMENT

Then, an example of the construction of the liquid crystal lens element according to a second embodiment of the present invention is described as follows.

Figure 5:
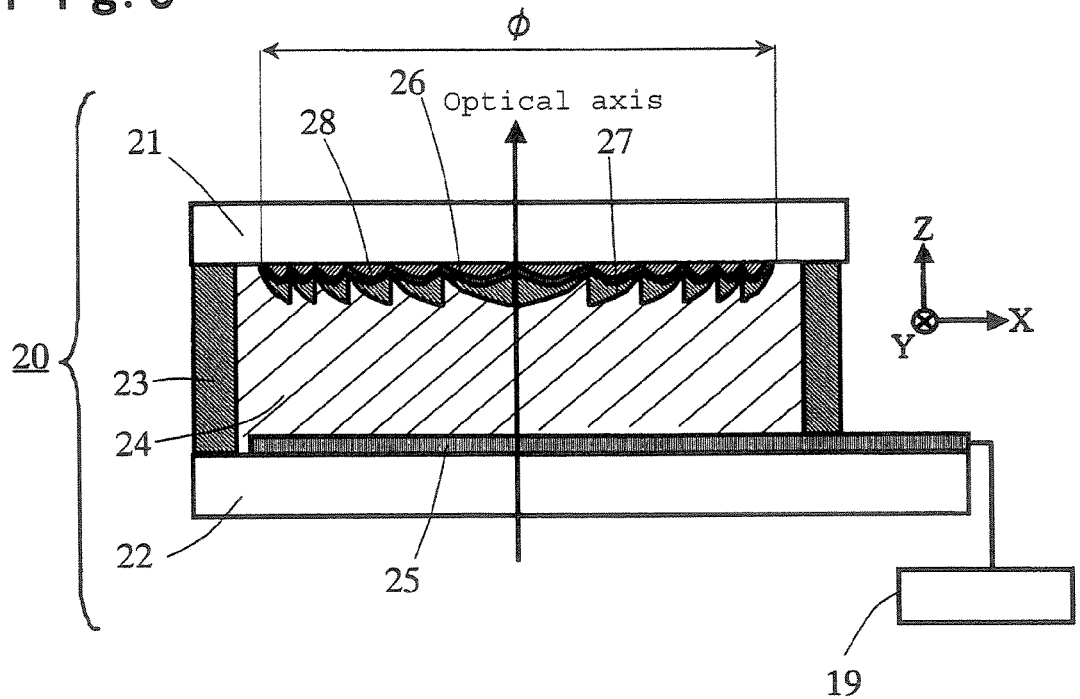
FIG. 5: A cross-sectional schematic view showing a liquid crystal lens element of the second embodiment of the present invention.

FIG. 5 is a cross-sectional view showing a liquid crystal lens element according to the second embodiment of the present invention. A liquid crystal lens element according to this embodiment has a liquid crystal layer 24 sandwiched by transparent substrates 21 and 22 and a seal 23. Among these, on a surface of the first transparent substrate 22, a transparent electrode 25 is formed. On the other hand, on a surface of the second transparent substrate 21, a phase correction surface 28, a transparent electrode 26 and a Fresnel lens surface 27 are formed in this order. The transparent electrodes 25 and 26 are connected with an external signal source 19 to apply a voltage to the liquid crystal layer 24. Here, although not shown in FIG. 5, on surfaces of the transparent electrode 25 and the Fresnel lens surface 27, alignment films for aligning the liquid crystal layer 24 are formed. Further, on outer surfaces of the transparent substrates 21 and 22, antireflective films may be formed.

Then, an example of a process for producing the liquid crystal lens element 20 is described as follows.

First of all, a transparent electrode 25 is formed on a surface of the transparent substrate 22. Meanwhile, on a surface of the transparent substrate 21, a phase correction surface 28 being a concave-convex annular shape around the optical axis is formed with a uniform refractive index transparent material having a refractive index $n_C$, is formed. Then, on an upper surface of the phase correction surface 28, a transparent electrode 26 is formed. Further, on an upper surface of the transparent electrode 26, a Fresnel lens surface 27 made of a uniform refractive index transparent material having a refractive index of $n_F$, constituted by a plurality of annular portions around an optical axis and having a cross-section of saw-tooth shape or a saw-tooth shape approximated by steps, is formed.

Then, surfaces of the transparent electrode 25 and the Fresnel lens surface 27, are subjected to parallel alignment treatment so that extraordinary refractive index direction of the liquid crystal layer becomes Y direction.

Then, on one surface of each of the transparent substrates 21 and 22 on which the transparent electrodes 25 and 26 are formed respectively, an adhesive agent, not shown, containing a gap control agent is patterned by printing to form a seal 23.

Then, the transparent substrates 21 and 22 are laminated and press-bonded to form an empty cell. Then, from an injection port (not shown) provided at a portion of the seal 23, a liquid crystal having an ordinary refractive index $n_o$ and an extraordinary refractive index $n_e$ (here, $n_o \neq n_e$) is injected, and thereafter, the injection port is sealed to seal the liquid crystal in the cell, to form the liquid crystal lens element 20 of this embodiment.

Here, the method of forming the Fresnel lens surface 27 and the phase correction surface 28 and the method of alignment treatment, may be the same as those of the first embodiment. The shape of the phase correction surface 28 may be the same as that of the phase correction surface 18 of the first embodiment, but since the Fresnel lens surface 27 is formed on the concave-convex shape of the phase correction surface 28, the Fresnel lens surface 27 is formed so that its thickness $d_F(r_m)$ becomes the same as the thickness $d_F(r_m)$ of the Fresnel lens surface 17 of the first embodiment.

The liquid crystal lens element 20 of this embodiment is different from the liquid crystal lens element 10 of the first embodiment only in that the position of the liquid crystal lens surface 27 is on the same substrate provided with the phase correction surface. Accordingly, the thicknesses of the Fresnel lens surface 27 and the liquid crystal layer 24 disposed between a pair of transparent electrodes 25 and 26, are the same as those of the first embodiment, and accordingly, the electro-optical characteristics of the liquid crystal lens element 20 of this embodiment are the same as those of the first embodiment. By forming the Fresnel lens surface 27 and the phase correction surface 28 on the same transparent substrate 21 like this embodiment, it is possible to reduce positional shift between the Fresnel lens surface 27 and the phase correction surface 28 in the process of producing the liquid crystal lens element 20, such being preferred.

THIRD EMBODIMENT

Then, an optical head device employing the liquid crystal lens element of the present invention is described as follows.

Figure 6:
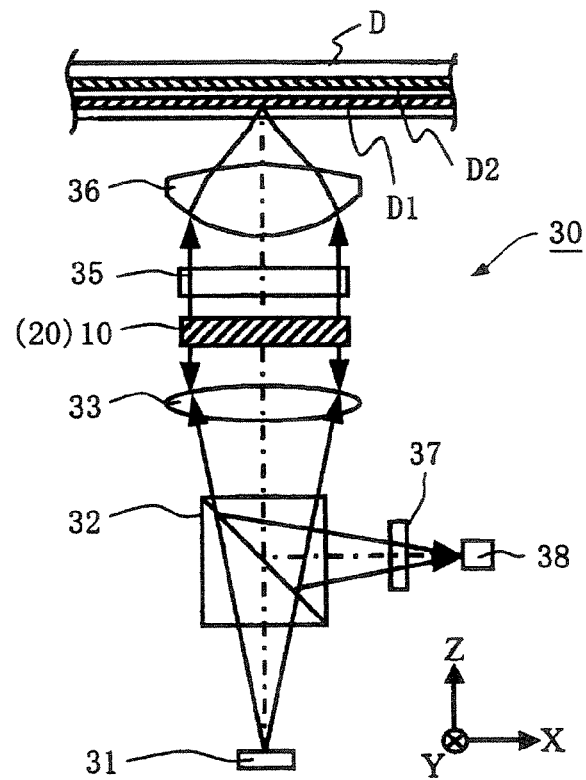
FIG. 6: A schematic view showing an example of an optical head device of the present invention.

FIG. 6 is a schematic view showing an example of an optical head device 30 employing the liquid crystal lens element of the present invention. The optical head device 30 is configured to write and/or read an information to/from a double layer optical disk D, and has a laser diode 31 as a light source, a polarizing beam splitter 32, a collimator lens 33, the liquid crystal lens element 10 (20) of the present invention, a quarter waveplate 35, an objective lens 36, a cylindrical lens 37 and a photodetector 38. Meanwhile, as the double layer optical disk D, e.g. a DVD or a high density optical disk is employed, which has a first recording layer D1 and a second recording layer D2.

The laser diode 31 may be a laser diode of any one of 780 nm band, 660 nm band and 405 nm band in terms of wavelength to use according to the type of optical disk D, or a plurality of laser diodes emitting different wavelengths may be disposed at different positions. Namely, combination of two laser diodes of these wavelengths may be employed. The combinations are e.g. a combination of 780 nm band and 660 nm band or a combination of 660 nm band and 405 nm band. The combination may be a combination of three wavelength bands. The liquid crystal lens element employed here may have an embodiment such as the first embodiment or the second embodiment. From now, the liquid crystal lens element 10 of the first embodiment shown in FIG. 1 is used for explanation. Accordingly, explanations of the structure, the production process and operation principle of the liquid crystal lens element are omitted. Here, an optical head device employing the liquid crystal lens element according to the present invention, may further appropriately employ different optical components such as diffraction gratings, hologram elements, polarization dependence selection elements, wavelength selective elements and wavefront conversion means, and mechanical parts besides the optical components shown in FIG. 6, to be used in combination.

At first, functions of the optical head device 30 according to this embodiment are described.

Linearly polarized light polarized in Y direction emitted from the laser diode 31 as a light source, is transmitted through a polarizing beam splitter 32, transmitted through a collimator lens 33, a liquid crystal lens element 10 and a quarter waveplate 35, and transformed into a circularly polarized light, and by an objective lens 36, converged on a first recording layer D1 or the second recording layer D2 in the optical disk D. Meanwhile, light reflected by the optical disk D is transmitted again through the objective lens 36, the quarter waveplate 35 and transformed into linearly polarized light polarized in X direction, transmitted through the liquid crystal lens element 10 and the collimator lens 33, reflected by the polarizing beam splitter 32, transformed to have an astigmatism by a cylindrical lens 37, and incident into a photodetector 38.

Then, operations of writing and/or reading an information to/from recording layers D1 and D2 having different cover thicknesses by employing the optical head device 30 employing the liquid crystal lens element of the present invention, is described as follows.

Here, the objective lens 36 is assumed to be designed to have the minimum aberration for an intermediate cover thickness between the first recording layer D1 and the second recording layer D2. In this construction, at a time of converging light on a recording layer having a cover thickness different from the designed cover thickness, a spherical aberration is produced, which is proportional to the difference of cover thicknesses obtained by subtracting the designed thickness from the thickness of recording layer of the cover thickness, which makes reading and writing of an information difficult. The spherical aberration can be corrected by using diverging light or converging light produced by adding a power component to a plane wave, for light incident into the objective lens 36. Namely, for the first recording layer D1 where the cover thickness difference is negative, converging light produced by adding a positive power is used as the incident light, and for the second recording layer D2 where the cover thickness difference is positive, diverging light produced by adding a negative power is used as the incident light, and thereafter, the light is converged by the objective lens 36, whereby the spherical aberration is corrected and it becomes possible to normally read and/or write an information. From now, explanation is made to respective cases.

(i) A case of first recording layer D1 (cover thickness difference is negative):

At a time of writing and/or reading to/from the first recording layer D1, as described above, an AC voltage $V_{+1}$ is applied between transparent electrodes 15 and 16 (refer to FIG. 1) so that transmission wavefront through the liquid crystal lens element 10 becomes a slightly converging spherical wave. Accordingly, alignment direction of the liquid crystal layer 14 changes, which causes to produce a transmission wavefront having a positive power, namely, a transmission wavefront corresponding to a convex lens. Accordingly, it is possible to correct spherical aberration of light converged on the first recording layer D1.

(ii) A case of second recording layer D2 (cover thickness difference is positive):

At a time of writing and/or reading to/from the second recording layer D2, an AC voltage $V_{-1}$ is applied between the transparent electrodes 15 and 16 so that transmission wavefront through the liquid crystal lens element 10 becomes a slightly diverging spherical wave.

Accordingly, alignment direction of the liquid crystal layer 14 changes, which causes to produce a transmission wavefront having a negative power, namely, a transmission wavefront corresponding to a concave lens. Accordingly, it is possible to correct spherical aberration of light converged on the second recording layer D2.

(iii) A case of e.g. a single layer optical disk having zero cover thickness difference:

At a time of writing and/or reading to/from a recording layer having a cover thickness equal to the designed cover thickness of the objective lens, such as a single layer optical disk instead of the above-mentioned double layer optical disk D, an AC voltage $V_0$ is applied between the transparent electrodes 15 and 16 so that the transmission wavefront through the liquid crystal lens element 10 does not change.

Accordingly, by applying AC voltages $V_{+1}$, $V_{-1}$ and $V_0$ to total three cover thicknesses consisting of two cover thicknesses for the recording layers D1 and D2 of the double layer optical disk and the cover thickness of the single layer optical disk, it is possible to optimize converging performance, namely, to correct spherical aberration.

Thus, by changing the voltage applied to the liquid crystal layer, it is possible to correct spherical aberrations of two recording layers having different cover thicknesses.

Accordingly, the liquid crystal lens element can handle laser light of two or three different wavelength bands. Laser light of two different wavelength bands, is a combination of e.g. 780 nm wavelength band and 660 nm wavelength band, or a combination of 660 nm wavelength band and 405 nm wavelength band.

Further, in this embodiment, in an optical path from the laser diode 31 to the optical disk D (namely, in the outgoing path), if light incident into the liquid crystal lens element 10 is linearly polarized light, polarized in the direction of extraordinary refractive index of the liquid crystal layer 14, the lens function functions to the outgoing light as described above. On the other hand, for returning light (reflected light from the optical disk D), the polarization direction rotates by 90° by an effect of the quarter waveplate 35, the light becomes ordinarily polarized light for the liquid crystal layer 14. Accordingly, as described above, a fixed phase difference not depending on applied voltage is added to the light. However, by making the refractive index $n_F$ of the Fresnel lens surface and the refractive index $n_c$ of the phase correction surface equal to the ordinary refractive index $n_o$ of the liquid crystal layer 14, wavefront does not change, such being preferred. Here, in a case of correcting spherical aberration generated in returning light, the spherical aberration can be corrected by employing a construction in which a second liquid crystal lens element having the equivalent structure is laminated and integrated so that the extraordinary refractive index directions of the liquid crystal layers are perpendicular to each other, such being more preferred.

EXAMPLES

Example 1

Then, the liquid crystal lens element 10 of the present invention shown in the first embodiment is specifically described as follows with reference to FIG. 1.

To begin with, the process for producing the liquid crystal lens element 10 is described.

On one surface of a transparent substrate 12 made of a glass, a transparent conductive film (ITO film) is formed and patterned into a transparent electrode 15.

Further, on the transparent electrode 15, a SiON film made of a uniform refractive index material having a refractive index $n_F(=1.52)$ and a specific dielectric constant $\in_F(=4)$ is formed to have a film thickness d(=3.7 μm) by vapor deposition. Then, in order to make thus formed SiON film have a shape corresponding to the shape is of graph F2 of FIG. 2, by a photolithography technique and an etching technique to form a Fresnel lens surface 17 having a saw-tooth shaped cross-section and having a rotational symmetry about an axis (Z axis) of incident light as shown in FIG. 1, is formed from the SiON film. The maximum depth of the concave-convex shape of the Fresnel lens surface 17 is 2.7 μm.

Meanwhile, on a surface of a transparent substrate 11 made of a glass, a SiON film made of a uniform refractive index material having a refractive index $n_C(=1.52)$ is formed to have a film thickness d(=0.35 μm) by vapor deposition. Then, by a photolithography technique and an etching technique, a phase correction surface 18 as shown in FIG. 3 having a cross-sectional shape in which center of each annular portion is convex, and having a rotational symmetry about an axis (Z axis) of incident light, is formed from the SiON film. Further, on a surface of the phase correction surface 18, a transparent conductive film (ITO film) is formed and patterned to be a transparent electrode 16. Then, on surfaces of the transparent electrode 16 and the Fresnel lens surface 17, a liquid crystal alignment film made of polyimide is applied, baked and subjected to rubbing alignment treatment in Y-axis direction to form a liquid crystal alignment film. Further, on a surface of the transparent substrate 11, an adhesive agent containing a gap control agent having a diameter of 15 μm is patterned by printing to form a seal 13, and the transparent substrates 11 and 12 are laminated and press-bonded to form an empty cell in which the distance between the substrates is 15 μm. Thereafter, a nematic liquid crystal having a positive dielectric anisotropy, in which an ordinary refractive index is $n_o(=1.52)$ and an extraordinary refractive index is $n_e(=1.79)$, is injected from an injection port (not shown) of the empty cell, to form a liquid crystal layer 14. Then, the injection port is sealed by a UV-curable resin to form a liquid crystal lens element 10 shown in FIG. 1.

The liquid crystal lens element 10 thus formed is electrically connected with an external signal source 19 to apply a voltage to the liquid crystal layer 14, and light of wavelength 660 nm is incident into the liquid crystal lens element 10 to confirm lens function of the liquid crystal lens element 10. Namely, when applied voltage is increased from 0 V, substantial refractive index of the liquid crystal layer 14 in the rubbing direction changes from $n_e(=1.79)$ to $n_o(=1.52)$ However, substantial voltage $V_{LC}$ applied to the liquid crystal depends on the shapes of the Fresnel lens surface 17 and the phase correction surface 18 and changes according to the position according to formula (3), and thus, it is understandable that a phase difference $\phi$ generated by the liquid crystal lens element 10 changes according to the above-mentioned formula (4).

Figure 7:
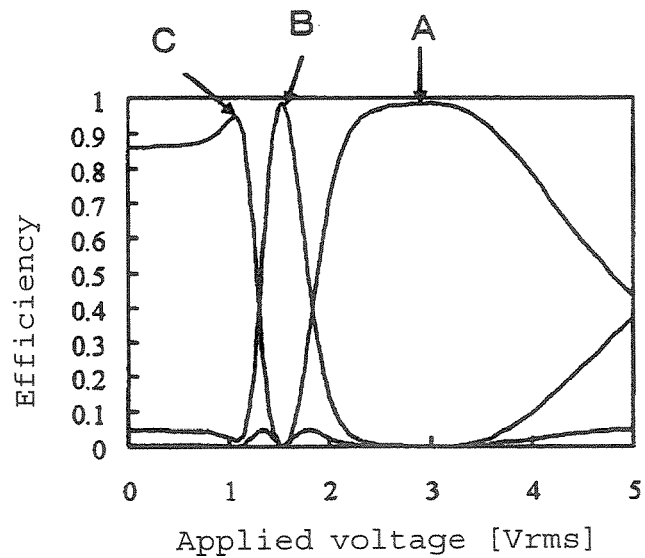
FIG. 7: An explanation view showing Fresnel diffraction efficiency of the liquid crystal lens element of the first embodiment of the present invention.
Figure 8:
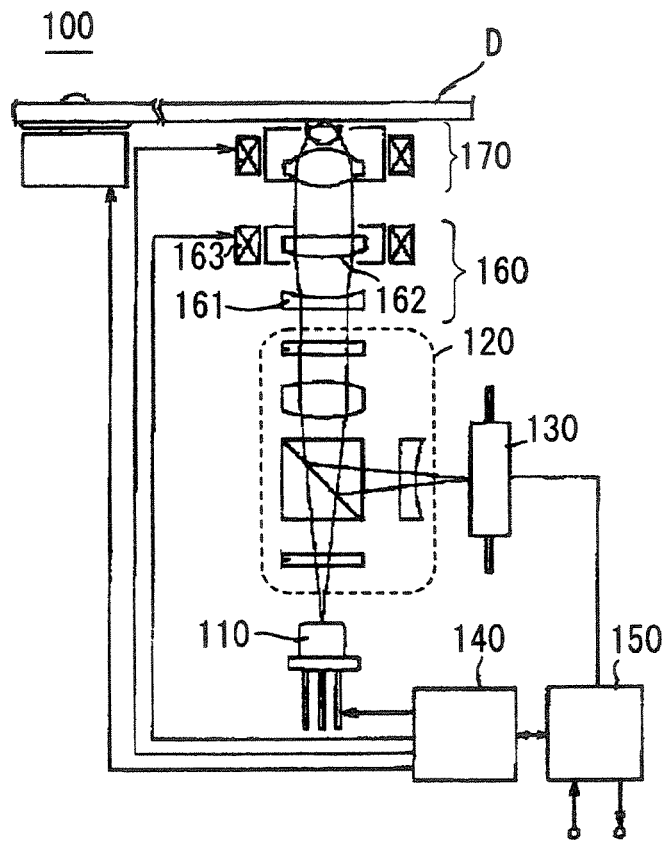
FIG. 8: A construction view showing a conventional optical head device employing a movable lens group as a spherical aberration correction element.
Figure 9:
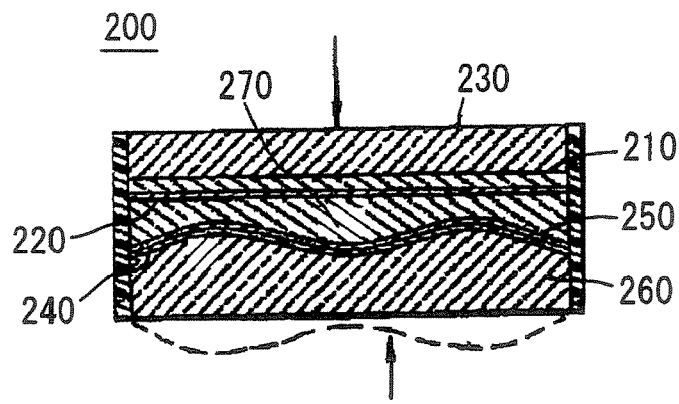
FIG. 9: A cross-sectional view showing an example of the construction of conventional liquid crystal lens.
Figure 10:
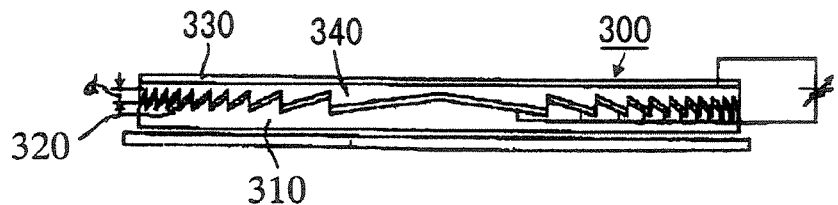
FIG. 10: A cross-sectional schematic view showing an example of the construction of conventional liquid crystal diffraction lens.

FIG. 7 is a view showing a Fresnel diffraction efficiency of the liquid crystal lens element 10 of Example 1. Here, in FIG. 7, horizontal axis represents a voltage applied between the transparent electrodes 15 and 16 using the external light source 19.

(i) When linearly polarized light polarized in Y direction is incident, phase difference changes as shown in FIG. 4(B) according to the magnitude of applied voltage, and wavefront of light transmitted through the liquid crystal lens element 10 changes.

For example, at an applied voltage 3.0 V, OP(1)<OP(0) is satisfied and the phase difference becomes $+\lambda$, which causes to transform incident plane wave into a slightly converging wavefront as a +1-st Fresnel diffraction wave. A +1-st Fresnel diffraction efficiency becomes, as shown by a graph A in FIG. 7, the maximum value 98% at an applied voltage 3.0 V. In the same manner, at an applied voltage 1.06 V, OP(1)>OP(0) is satisfied and the phase difference becomes $-\lambda$, which causes to transform the incident plane wave into a slightly diverging wavefront as a −1-st Fresnel diffraction wave. A −1-st Fresnel diffraction efficiency becomes the maximum value 95% at an applied voltage 1.06 V as represented by graph C in FIG. 7. On the other hand, at an applied voltage 1.52 V, since no phase difference is generated by an effect of phase correction surface 18 as represented by FIG. 4(B) at the applied is voltage $V_0$, the incident wave is transmitted as a 0-th order Fresnel diffraction wave whose wavefront is not changed. A 0-th order Fresnel diffraction efficiency becomes the maximum value 98% at an applied voltage 1.52 V as represented by graph B in FIG. 7.

As described above, when the applied voltage is changed from 1.06 V through 1.52 V to 3.0 V, the liquid crystal lens element of the present invention functions as "concave lens", "no lens function" and "convex lens" respectively.

(ii) Then, when linearly polarized light polarized in X direction is incident, substantial refractive index of the liquid crystal layer 14 becomes $n_o=n_F$, and thus, no lens function is generated.

Accordingly, by using the liquid crystal lens element of the present invention, it is possible to switch lens function for linearly polarized light polarized in Y direction according to applied voltage.

Example 2

Then, an example of the optical head device shown in FIG. 6 employing the liquid crystal lens element 10 shown in Example 1 as a liquid crystal lens element, is specifically described as follows with reference to FIG. 6.

A light source 31 is a laser diode of wavelength 660 nm, and light is transformed into parallel light by a collimator lens 32 and incident into the liquid crystal lens element 10. A double layer optical disk D has a first recording layer D1 having a cover thickness of 0.57 mm and a second recording layer D2 having a cover thickness of 0.63 mm. An objective lens 36 has a NA of 0.65 and a pupil diameter of 4.0 mm and designed to minimize wavefront aberration for a single optical disk having a cover thickness of 0.6 mm. Namely, converging performance is optimized for three different cover thicknesses.

When a voltage $V_0=1.52$ V at which the liquid crystal lens element 10 does not show a lens function, is applied to transparent electrodes 15 and 16 from an external signal source 19, wavefront aberration of light converged on each of the recording layers becomes at least 0.1 $\lambda$rms by an effect of spherical aberration proportional to the difference of cover thickness, which significantly deteriorates light-converging performance.

Then, in a case of converging light on the first recording layer D1 by applying a voltage $V_{+1}=3.0$ V between the transparent electrodes 15 and 16, and a case of converging light on the second recording layer D2 by applying a voltage $V_{-1}=1.06$ V between the transparent electrodes, spherical aberration is corrected to be at most 0.01 $\lambda$rms, which improves light-converging performance.

Further, when a single layer optical disk having a cover thickness of 0.6 mm is disposed instead of the double layer optical disk D and a voltage $V_0=1.52$ V is applied between the transparent electrodes 15 and 16, wavefront of light transmitted through the liquid crystal lens element 10 does not change. Further, as represented by graph B of FIG. 7, by the effect of phase correction surface, it is possible to lead 98% of light transmitted through the liquid crystal lens element 10 to an objective lens 36.

As described above, by using the liquid crystal lens element of the present invention, it is possible to correct spherical aberration generated according to a cover thickness difference in a double layer disk or a single layer disk. Further, by the effect of the phase correction surface provided in the liquid crystal lens element, it is possible to obtain high Fresnel lens diffraction efficiency.

INDUSTRIAL APPLICABILITY

The liquid crystal lens element of the present invention can be used as a focal-length-switching-lens capable of discretely and significantly changing the focal length by switching the magnitude of applied voltage. Particularly, at a time of writing and/or reading to/from an optical disk having two information recording layers having different cover thicknesses, since the liquid crystal lens element of the present invention corrects a spherical aberration mainly by generating a power component, no aberration is generated when the liquid crystal lens element and an objective lens is misaligned. Accordingly, the liquid crystal lens element of the present invention eases a restriction of positional arrangement, and can be applied to e.g. an optical head device as a small-sized unit integrated with a light source, a photodetector or a beam splitter.

The entire disclosure of Japanese Patent Application No. 2004-208302 filed on Jul. 15, 2004 including specification, claims, drawings and summary is incorporated herein by reference in its entirety.

What is claimed is:

1. A liquid crystal lens element comprising a pair of transparent substrates and a liquid crystal layer sandwiched between the transparent substrates and being configured to change focal point of light transmitted through the liquid crystal lens element according to the magnitude of applied voltage;
   wherein one of the pair of transparent substrates is provided with a phase correction surface constituted by annular portions arranged about an optical axis of the light and having a cross-section of concave-convex shape;

a surface of the phase correction surface and a surface of the other one of the pair of transparent substrates are provided with respective transparent electrodes for applying a voltage to the liquid crystal layer; and between the transparent electrodes, a Fresnel lens surface having a rotational symmetry with respect to the optical axis of the light and a cross-section of saw-tooth shape or a cross-section of a saw-tooth shape approximated by steps and made of a transparent material, and the liquid crystal layer are provided.

2. The liquid crystal lens element according to claim 1, wherein the refractive index of the transparent material constituting the Fresnel lens surface substantially equals to the ordinary refractive index of the liquid crystal layer, and light transmitted through the liquid crystal layer is linearly polarized light having a polarization direction being substantially equal to the extraordinary refractive index direction of the liquid crystal layer.

3. The liquid crystal lens element according to claim 1, wherein the Fresnel lens surface and the phase correction surface are formed on the same substrate surface so as to sandwich one of the transparent electrodes.

4. The liquid crystal lens element according claim 1, wherein at least one of the transparent substrates is made of quartz glass and the phase correction surface is formed by etching the surface of the quartz glass.

5. The liquid crystal lens element according to claim 1, wherein provided that the liquid crystal lens element is designated as a first liquid crystal lens element, besides the first liquid crystal lens element, a second liquid crystal lens element having the same construction as the first liquid crystal lens element is provided and the first and second liquid crystal lens elements are laminated and integrated so that the extraordinary refractive index directions of the respective liquid crystal layers are perpendicular to each other.

6. The liquid crystal lens element according to claim 1, wherein a phase plate producing a phase difference of an odd number times of $\Pi/2$ of the wavelength of the light, is integrated with the liquid crystal lens element.

7. The liquid crystal lens element according to claim 1, wherein the refractive index of the transparent material constituting the phase correction surface is equal to the ordinary refractive index of the liquid crystal layer.

8. The liquid crystal lens element according to claim 1, wherein the phase correction surface and the Fresnel lens surface are disposed so that annular concave portions or convex portions of the phase correction surface having a cross-section of concave-convex shape, overlaps annular convex portions of the Fresnel lens surface in the optical axis direction.

9. An optical head device comprising a light source, an objective lens for converging light emitted from the light source on an optical recording medium, a photodetector for detecting light reflected by the optical recording medium, and the liquid crystal lens element as defined in claim 1 disposed in an optical path between the light source and the objective lens.

10. The optical head device according to claim 9, which is adapted for three types of cover layers having different thicknesses covering recording layers of the optical recording medium, and which is capable of switching voltage applied to the liquid crystal lens element among voltages corresponding to the three types of thicknesses so that light-converging performance of the optical head device is optimized for the respective recording layers.

* * * * *